United States Patent [19]

Perletti

[11] Patent Number: 5,176,835
[45] Date of Patent: Jan. 5, 1993

[54] APPARATUS FOR CONTINUOUS PURIFICATION OF LIQUIDS

[75] Inventor: Fabio Perletti, Piazzale dello Sport 4, 20151 Milan, Italy

[73] Assignee: Fabio Perletti, Milan, Italy

[21] Appl. No.: 652,732

[22] Filed: Feb. 8, 1991

[30] Foreign Application Priority Data

Feb. 16, 1990 [IT] Italy ............... 19401 A/90

[51] Int. Cl.⁵ ............... B01D 17/035; C02F 1/24
[52] U.S. Cl. ................... 210/703; 210/707; 210/221.2; 210/519; 210/525; 210/530; 209/170
[58] Field of Search ........... 210/703, 221.1, 221.2, 210/519, 530, 707, 525; 209/170

[56] References Cited

U.S. PATENT DOCUMENTS

| | | | |
|---|---|---|---|
| 2,223,257 | 11/1940 | Mallory | 210/530 |
| 2,695,710 | 11/1954 | Gibbs | 210/221.2 |
| 2,874,842 | 2/1959 | Krofta | 210/540 |
| 3,446,488 | 5/1969 | Mail | 210/221.2 |
| 4,022,696 | 5/1977 | Krofta | 210/530 |
| 4,175,041 | 11/1979 | Drnevich | 210/530 |
| 4,184,967 | 1/1980 | Krofta | 209/168 |
| 4,784,764 | 11/1988 | Kleinschnittger | 210/525 |
| 4,931,175 | 6/1990 | Krofta | 210/530 |

FOREIGN PATENT DOCUMENTS 2808123 8/1978 Fed. Rep. of Germany .
2268757 11/1975 France .

Primary Examiner—Wilbur Bascomb, Jr.
Assistant Examiner—Thomas M. Lithgow
Attorney, Agent, or Firm—Guido Modiano; Albert Josif

[57] ABSTRACT

An apparatus and method for the continuous clarifying of liquids containing suspended solid substances comprises a flotation cell with a liquid head height of less than 1 meter, with a ratio between the liquid head and the cell diameter comprised between 0.25 and 0.05. The cell has a bottom axial inlet for liquid to be clarified, supersaturated with gas, so as to generate an axial ascending current of the liquid to be clarified with radial divarication toward the surface of the liquid head. A framework associated with the cell rotates concentrically with respect thereto and supports a spillway unit for collecting the flotated layer and a scraper unit which affects all the wet surfaces of the cell. A discharge outlet is furthermore provided in the lower part of the cell for the outflow of clarified liquid which falls toward the bottom of the cell.

4 Claims, 2 Drawing Sheets

APPARATUS FOR CONTINUOUS PURIFICATION OF LIQUIDS

BACKGROUND OF THE INVENTION

The present invention relates to an apparatus for continuous purification of liquids, and in particular to an apparatus for the continuous clarifying of liquids with suspended solid substances by means of the dissolved gas flotation process.

As is known, in the dissolved gas flotation process, also known as differentiated pressure flotation, the flow of liquid to be treated entering into the flotation container, or part of said flow, is preliminarily saturated with gas which is dissolved in the liquid, under pressure, in a special pressurization tank. A sharp pressure reduction is then performed by means of a reduction valve immediately before the entry of the liquid into the flotation cell, so that all the supersaturated gas is released in the form of microscopic bubbles (30–100 $\mu$) which are finely dispersed in the entire volume of liquid and adhere to the solid particles suspended in the liquid, forming an aggregate with a relative density which is lower than that of the liquid from which it separates, moving toward the surface. The solid particles concentrated at the surface are then removed by means of a spillway system.

In conventional apparatus, the hydraulic load in the tank is normally comprised between 3 and 5 $m^3/h \times m^2$ of tank surface, with minimum permanence times of approximately 30 minutes; these conditions occur in flotation tanks with a liquid or hydraulic head generally comprised between 2 and 3 m.

The U.S. Pat. No. 4,022,696 describes a flotation cell capable of operating with high hydraulic loads (up to 10 $m^3/h \times m^2$) which allows to reduce tank permanence times considerably, in practice reducing the depth or liquid head of said tank.

This apparatus, however, has considerable constructive complexity, since a structurally considerably complicated and expensive movable system for the distribution of the liquid to be clarified and for drawing the clarified liquid is provided.

This system furthermore entails the use of tubes and partitions, both for distributing the liquid to be treated and for drawing the clarified liquid, which can easily be dirtied and are difficult to clean rapidly and efficiently.

SUMMARY OF THE INVENTION

The aim of the invention is indeed to solve the above described problem by providing an apparatus for the continuous clarifying of liquids with suspended solid substances which allows to achieve high production per hour without however having the above mentioned constructive complexities.

Within the scope of the above described aim, a particular object of the invention is to provide a flotation apparatus which achieves greater operating efficiency together with reduced constructive complexity.

Another object of the present invention is to provide a flotation apparatus which is self-cleaning during operation and is completely accessible in its components for rapid and radical cleaning, this being fundamentally important when it is necessary to perform periodic treatments on different sludges within the scope of predominantly industrial processes, such as production changeover in paper mills, dyeing plants, clarifying processes for food liquids, juices, beverages and the like.

Not least object of the present invention is to provide an apparatus for the continuous clarifying of liquids which, by virtue of its peculiar characteristics of execution, is capable of giving the greatest assurances of reliability and safety in use and is furthermore competitive from a merely economical point of view.

This air, the objects mentioned and others which will become apparent hereinafter are achieved by an apparatus for clarifying waste liquid with a dissolved gas flotation process which includes: a flotation cell having a liquid-holding space with a height of less than 1 meter and between 5 and 25 percent of its diameter; means for supersaturating the liquid to be clarified with a gas and means for feeding the supersaturated liquid into the flotation cell; means for collecting solid particles at the upper surface of the liquid-holding space defined by the flotation cell; and means for delivering clarified liquid from the bottom of the flotation cell; in which the means for feeding the liquid include an inlet which is arranged axially on the bottom of the flotation cell and which opens directly therefrom into the liquid-holding space. With such a structural arrangement, an axial ascending current of the liquid to be clarified directly into the liquid-holding space and directly from the bottom of the flotation cell, and a radial divarication current at the upper surface of the liquid-holding space downstream of such axial ascending current, are advantageously generated.

BRIEF DESCRIPTION OF THE DRAWINGS

Further characteristics and advantages will become apparent from the description of a preferred but not exclusive embodiment of an apparatus for the continuous clarifying of liquids with suspended solid substances, illustrated only by way of non-limitative example in the accompanying drawings, wherein.

DESCRIPTION OF THE PREFERRED EMBODIMENTS

With reference to the above figures, the theoretical concept underlying the invention is that of better exploiting the arrangement of the hydraulic flow assumed by a liquid to be clarified, preliminarily supersaturated with dissolved gas, when it is fed into a flotation cell.

In the dissolved gas flotation process, the liquid to be clarified which is fed into the container or flotation cell is constituted by dispersed gas in the form of micro-bubbles and by liquid in percentages which normally vary from 15 to 90 liters of gas for every 1000 liters of liquid. This means that the density of the fluid constituted by the mixture of dispersed gas and liquid has values which can vary respectively between 0.985 and 0.91 with respect to the density of the liquid without gas.

This difference in density between the inflowing liquid, i.e. gas plus liquid, and the surrounding fluid, i.e. liquid alone, is such as to cause in practice a density current which is absolutely predominant with respect to the relative movements between the suspended solid/- gas bubbles conglomerate and the surrounding liquid which characterize the ascending flotation speeds.

Said density current in fact moves in practice, at its inflow into the tank, in an upward vertical direction with a speed in the range of 100-200 m/h, against the 5-20 m/h of normal flotation ascending speeds; furthermore, these two speeds have the same direction and orientation, so that in practice they are added to one another.

The density current is further increased if, as often occurs in practice, the liquid to be clarified flowing into the cell is at a higher temperature than that of the surrounding liquid.

Figure 1:
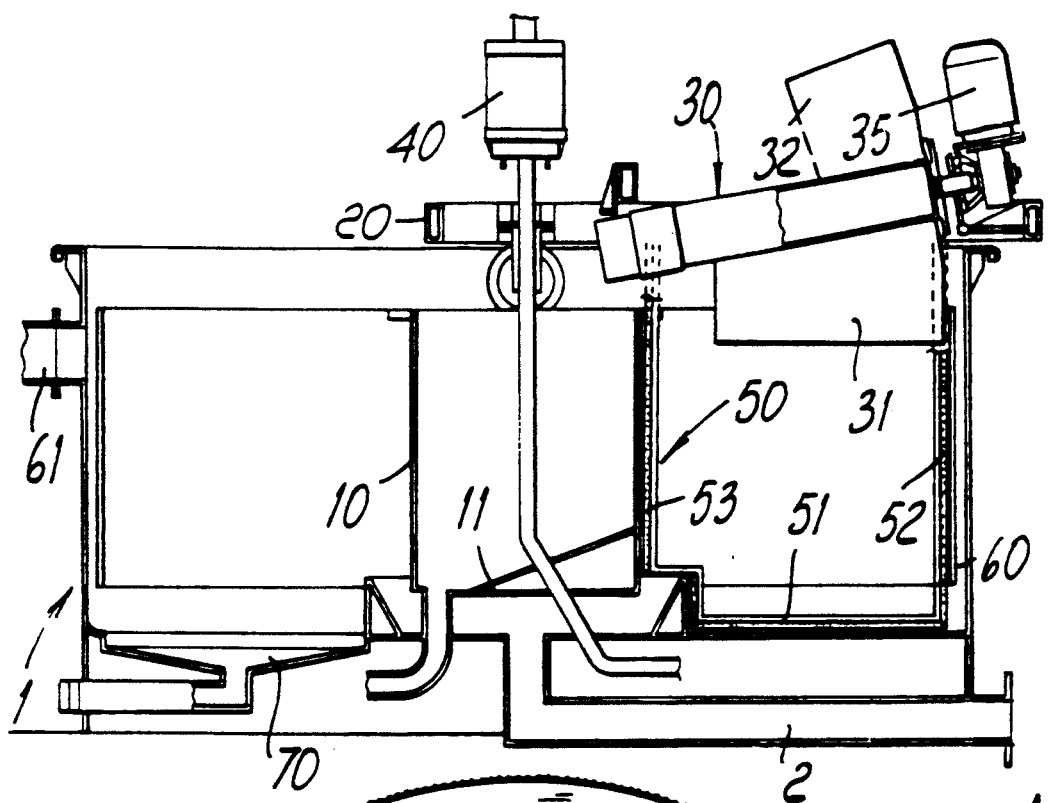
FIG. 1 is a schematic sectional view of the cell of the apparatus according to the invention.
Figure 2:
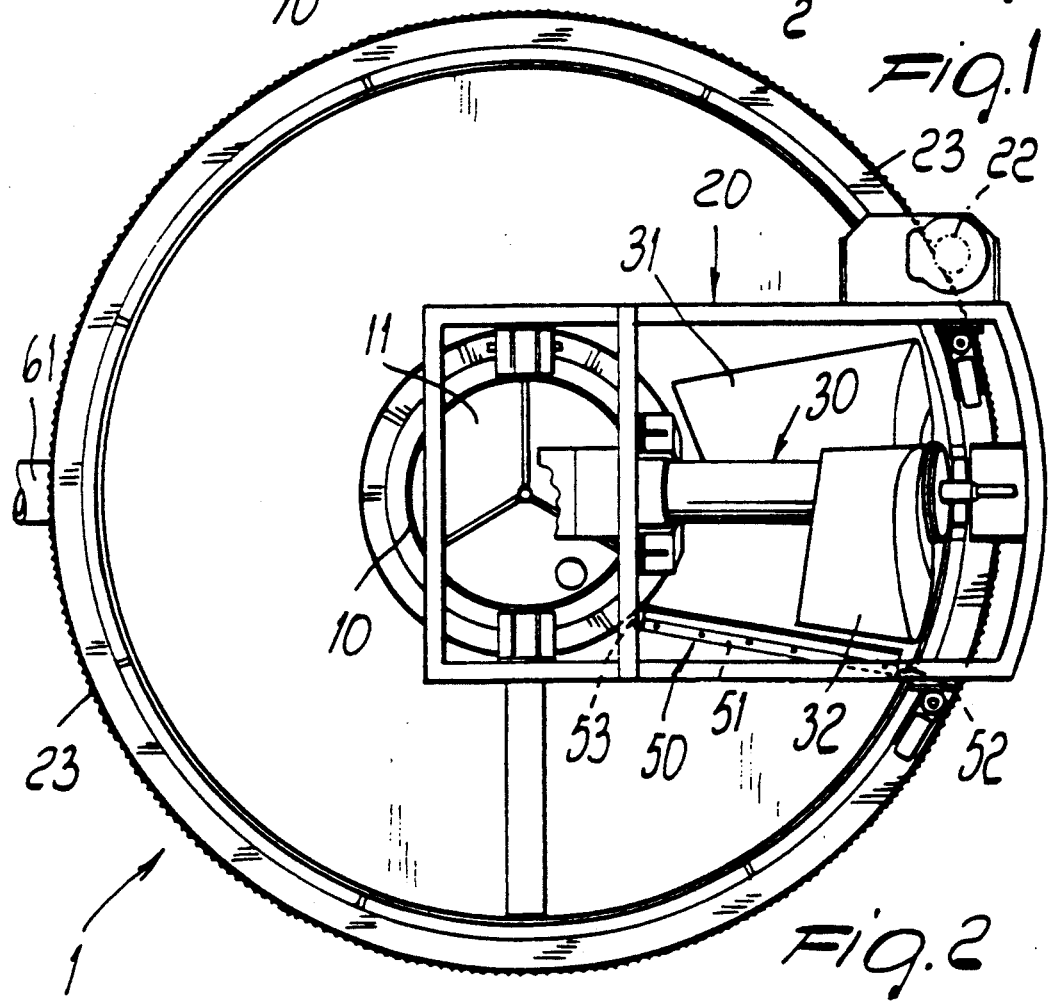
FIG. 2 is a schematic plan view of the cell.
Figure 3:
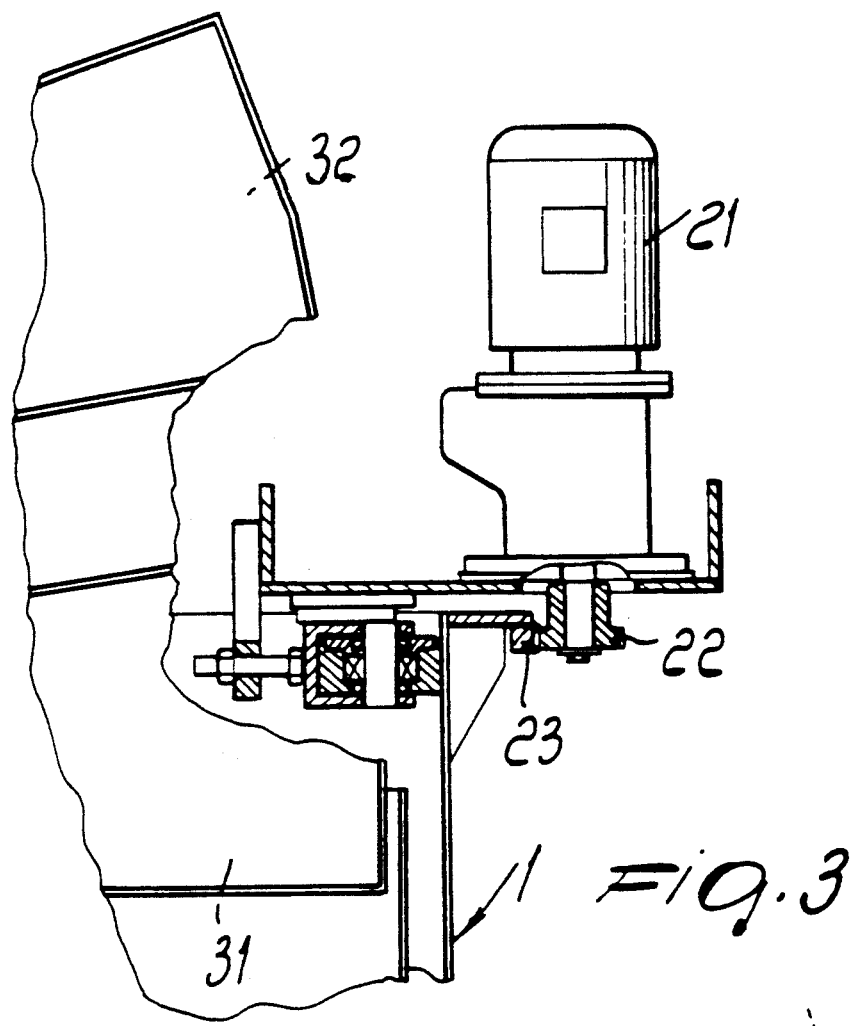
FIG. 3 is a view of the detail of the means for moving the rotating framework.
Figure 4:
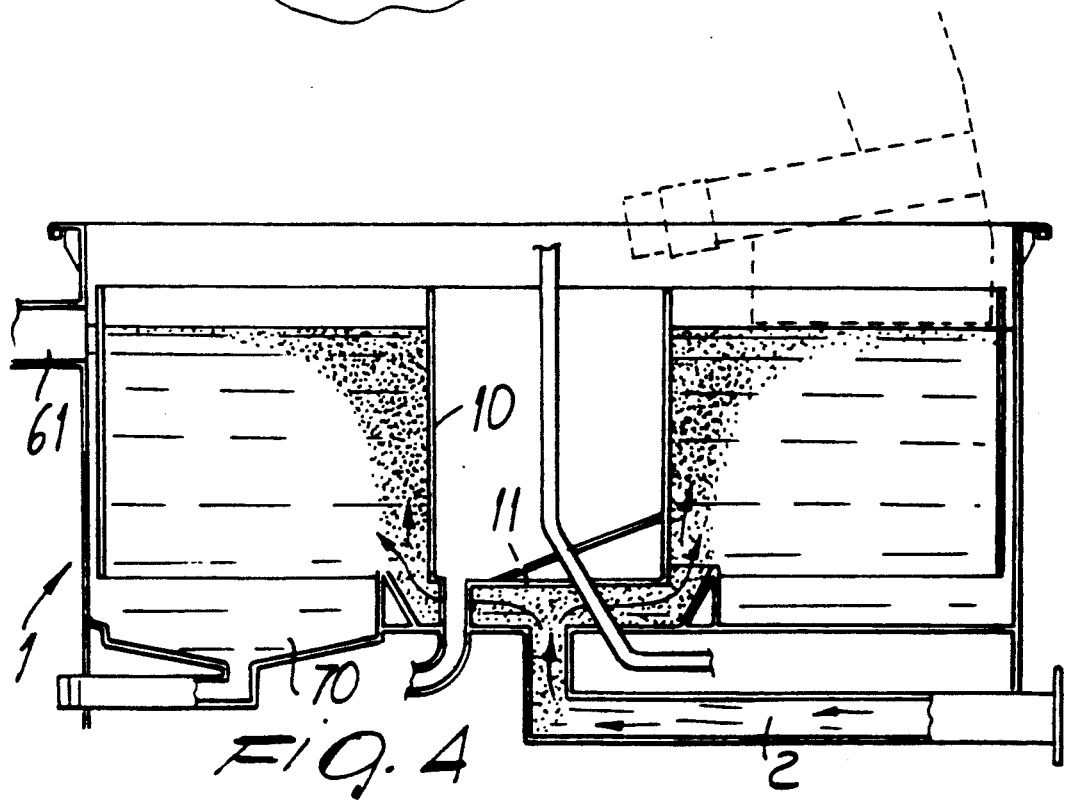
FIG. 4 is a functional diagram illustrating the distribution of the clarified liquid.

In practice one obtains, as better illustrated schematically in FIG. 4, a path in which the liquid to be clarified, which is supersaturated with gas, by being fed axially into the flotation cell with circular cross section, in practice creates an axial region with a considerably high flow speed. In this way, the liquid to be clarified, supersaturated with dispersed gas, tends to move toward the surface of the liquid head, where it divaricates radially, in practice decreasing in thickness and speed until it peters out toward the peripheral region.

This is obtained both due to an obvious geometric correlation related to the passage cross section of the flow, which rises proportionally to the radius of the tank, and because the intensity of the density current of the liquid to be clarified decreases spontaneously in the course of time as the micro-bubbles of gas contained therein are released spontaneously.

In practice, the clarified liquid descends spontaneously toward the bottom of the tank, leaving on the surface the particles which were suspended.

Therefore, by exploiting the ascending flow produced by the lower density of the liquid to be clarified, supersaturated with dispersed gas, a n current is in practice created which carries the suspended particles immediately to the surface, with a subsequent descent of the clarified liquid toward the bottom of the tank, where drawing occurs.

In practice, this phenomenon is obtained by using a flotation cell which defines a liquid-holding space with a liquid head of less than 1 meter and normally comprised between 50 and 80 cm, according to the smaller or greater diameter of the cell, obtaining a ratio between the liquid head and the cell diameter comprised between 0.25 (for smaller diameters) and 0.05 (for larger diameters).

A considerable functional advantage and a significant structural advantage are thus obtained, since the volume of the tank and consequently the volume of the liquid being treated are reduced considerably but a very high clarifying efficiency is maintained.

In practice, the flotation cell, which is generally indicated by the reference numeral 1, has a substantially cylindrical configuration with an inlet for the inflow of the liquid to be clarified, already supersaturated with gas, indicated by 2, which leads onto the bottom of the cell 3 in an axial position.

An axial deflector body 10 is provided above the point at which the liquid to be clarified is fed into the tank and has a closed bottom 11 and a hollow interior for the function which will become apparent hereinafter; said body in practice acts as divider of the flow which rises axially, affecting the deflector body 10, carrying the liquid to be clarified toward the free surface of the liquid head, where due to the previously explained reasons the flow of the liquid to be clarified tends to divaricate in a radial direction, decreasing in thickness, and the clarified liquid falls toward the bottom of the cell and releases the suspended particles on the surface.

A framework 20 is supported concentrically to the cell 1 and is provided with a first motor 21 for rotating said framework about said tank.

Said first motor 21 actuates a pinion 22 which meshes with a circular rack 23 which is provided on the tank rim and has the function of achieving constant and uniform movement with respect to the tank.

The framework 20 furthermore supports an overflow or spillway unit 30 which is constituted by a first rotating blade 31 with spiral-shaped cross section and by a second rotating blade 32 which affects only the outer half of the radial region so as to achieve a more uniform collection of the flotated layer on the upper surface of the liquid-holding space of the cell which, by virtue of the inclination of the axis of the spillway unit, is conveyed toward the inside of the deflector body 10 and from there to the discharge.

The number of blades may obviously be increased toward the peripheral region in order to have uniform collection, even with very large tank diameters.

A second motor 35, which operates independently of the first motor 21, is provided in order to rotate the shaft of the spillway unit.

The power supply of the motors is provided by means of a rotating joint 40 which is axially supported inside the tank.

Another important peculiarity of the invention is constituted by the fact that a scraper unit, generally indicated by the reference numeral 50, is associated with the framework and has a bottom scraper 51 and an external circumferential scraper 52 extending parallel to the axis and an inner circular scraper 53 which is also parallel to the axial extension.

In this manner all the wet surfaces are cleaned automatically, since the scraper unit performs automatic cleaning during the normal rotation of the framework.

According to what is illustrated in the figures, a discharge outlet 60 is provided at the bottom region and is located, in the illustrated example, on the lower part of the outer side wall, where the clarified liquid is collected and conveyed outward by means of the duct 61.

It is also conceptually possible to provide the application of the discharge outlet on the bottom of the tank in a region comprised between ⅓ and 3/3 of the diameter of the tank.

For the sake of completeness in description, it should be furthermore added that a collecting hopper, indicated by 70, is provided on the bottom of the cell for the removal of any sedimented particles or bodies which might fall by gravity to the bottom.

From what has been described above it can thus be seen that the invention achieves the proposed aim and objects, and in particular the fact is stressed that a flotation apparatus for continuous clarifying is provided in which a cell with a very small liquid head height is provided without complicated systems aimed at establishing a nonetheless impossible rest state of the sludge in the tank, with the possibility of achieving the continuous self-cleaning of the tank during operation and with no dead zones of sludge stagnation.

Another important aspect of the invention is constituted by the fact that each point of the tank is easily and immediately accessible for effective cleaning, which is obtained automatically during operation.

To the above it should be also added that with the apparatus according to the invention the flotation process is performed by sending all the suspended particles immediately toward the surface and by drawing the clarified liquid, which in practice falls toward the bottom of the tank.

The invention thus conceived is susceptible to numerous modifications and variations, all of which are within the scope of the inventive concept.

All the details may furthermore be replaced with other technically equivalent elements.

In practice, the materials employed, as well as the dimensions and contingent shapes, may be any according to the requirements.

I claim:

1. Apparatus for clarifying waste liquid with a dissolved gas flotation process, comprising:
    a flotation cell, said flotation cell having a substantially horizontal bottom and a substantially cylindrical wall extending vertically from said bottom, said flotation cell defining a liquid-holding space for containing the waste liquid, said space being delimited by said bottom and said wall of said flotation cell, said space having an upper substantially planar surface, said space having a height extending from said bottom of said flotation cell to said upper planar surface, said height of said space being less than one meter, said space having a diameter, said height of said space being comprised between 25 and 5 percent of said diameter of said space;
    means for supersaturating the liquid to be clarified with a gas;
    means for feeding the liquid to be clarified which has been supersaturated with gas into said flotation cell;
    means for collecting solid particles at said planar surface of said space defined by said flotation cell, said means for collecting solid particles being concentrically rotatably mounted with respect to said flotation cell;
    means for removing clarified liquid from said bottom of said flotation cell; wherein
    said means for feeding the liquid into said flotation cell comprise an inlet arranged on the bottom of said flotation cell and substantially axially thereto, said inlet opening directly into said liquid-holding space from said bottom so as to generate an axial ascending current of the liquid to be clarified directly into said space and directly from the bottom of the flotation cell, said apparatus further comprising a deflector body means arranged axial inside said flotation cell for generating a radial divarication current at the upper surface of said liquid-holding space, said deflector body means having a closed bottom facing said inlet, said deflector body means having a width which is less than half the diameter of said liquid-holding space of said flotation cell.

2. Apparatus according to claim 1, wherein said means for collecting solid particles at said planar surface of said space comprise:
    a framework supported concentrically by said flotation cell;
    a first motor for rotating said framework about said cell;
    a spillway unit connected to said framework and comprising a rotating shaft extending radially above said upper surface of said liquid-holding surface;
    a second motor for rotating said shaft; and
    a multiple bucket which is connected to said rotating shaft; wherein
said multiple bucket comprises a first bucket for affecting an entire radial portion of said upper surface of said liquid-holding space of said flotation cell and a second bucket for affecting only an outer periphery portion of said upper surface.

3. Process for clarifying waste liquid with a dissolved gas flotation process, comprising the steps of:
    supersaturating the waste liquid to be clarified with a gas;
    feeding a flow of waste liquid which has been supersaturated with gas into a liquid-holding space which is defined in a flotation cell, in which said flotation cell having a substantially horizontal bottom and a substantially cylindrical wall extending vertically from said bottom, said space being delimited by said bottom and said wall of said flotation cell, said space having an upper substantially planar surface, said space having a height extending from said bottom of said flotation cell to said upper planar surface, said height of said space being less than one meter, said space having a diameter, said height of said space being comprised between 25 and 5 percent of said diameter of said space;
    collecting solid particles from said waste liquid at said planar surface of said space defined by said flotation cell; and
    removing clarified liquid from said bottom of said flotation cell; wherein
said feeding of the waste liquid into said flotation cell is performed directly and axially from said bottom of said flotation cell and thereby the process further comprises the steps of:
    generating an axial ascending current of the liquid to be clarified directly into said space and directly from the bottom of the flotation cell; and
    generating a radial divarication current at said upper surface of said liquid-holding space downstream of said axial ascending current.

4. Process according to claim 3, further comprising the step of deflecting by a radial deflection distance said axial ascending current after said axial ascending current has entered said space from said bottom of said flotation cell, said radial deflection distance being considerably less than said diameter of said liquid-holding space of said flotation tank, and thereby said radial divarication current is maintained.

* * * * *

UNITED STATES PATENT OFFICE
CERTIFICATE OF CORRECTION

Patent No. 5,176,835           Dated   January 5, 1993

Inventor(s)   Fabio PERLETTI

It is certified that error appears in the above-identified patent and that said Letters Patent is hereby corrected as shown below:

On the title page, item: |73| Assignee: please add —O.M.C. OFFICINA MECCANICA COLLAREDA S.r.l., SCHIO/Italy—

Signed and Sealed this

Twenty-second Day of November, 1994

Attest:

BRUCE LEHMAN

Attesting Officer            Commissioner of Patents and Trademarks